(12) United States Patent
Feisst et al.

(10) Patent No.: US 10,371,556 B2
(45) Date of Patent: Aug. 6, 2019

(54) DEVICE FOR DETERMINING OR MONITORING THE FILLING LEVEL OF A FILLING MATERIAL STORED IN A CONTAINER

(71) Applicant: Endress + Hauser GmbH + Co. KG, Maulburg (DE)

(72) Inventors: Klaus Feisst, Stegen (DE); Eric Bergmann, Steinen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 362 days.

(21) Appl. No.: 15/116,255

(22) PCT Filed: Jan. 16, 2015

(86) PCT No.: PCT/EP2015/050780
§ 371 (c)(1),
(2) Date: Aug. 3, 2016

(87) PCT Pub. No.: WO2015/117808
PCT Pub. Date: Aug. 13, 2015

(65) Prior Publication Data
US 2017/0010142 A1    Jan. 12, 2017

(30) Foreign Application Priority Data

Feb. 5, 2014 (DE) .......................... 10 2014 101 410

(51) Int. Cl.
*G01S 7/03* (2006.01)
*G01F 23/284* (2006.01)
*G01S 13/88* (2006.01)

(52) U.S. Cl.
CPC .............. *G01F 23/284* (2013.01); *G01S 7/03* (2013.01); *G01S 13/88* (2013.01)

(58) Field of Classification Search
CPC .......... G01F 23/284; G01S 13/88; G01S 7/03; G01S 5/30; G01S 7/411
(Continued)

(56) References Cited

U.S. PATENT DOCUMENTS 5,041,804 A    8/1991  Brown
5,580,822 A *  12/1996 Hayakawa .............. C23C 16/20
                                                        117/83
(Continued)

FOREIGN PATENT DOCUMENTS

CN    103003677 A    3/2013
DE    68913728 T2    9/1994
(Continued)

OTHER PUBLICATIONS

German Search Report, German Patent Office, Munich, DE, dated Oct. 27, 2014.
(Continued)

*Primary Examiner* — Timothy X Pham
(74) *Attorney, Agent, or Firm* — Bacon & Thomas, PLLC

(57) ABSTRACT

A device for determining or monitoring the filling level of a filling material stored in a container in a process, comprising a signal generating unit, a coupling/decoupling unit which couples the high-frequency measurement signals to an antenna unit or decouples said high-frequency measurement signals from the antenna unit. The antenna unit has a wave guide and an antenna element which widens in the direction of the filling material. The antenna unit emits high-frequency measurement signals in the direction of the surface and receives the echo signals reflected by the surface of the filling material. A control/evaluation unit determines the filling level of the filling material in the container from the transit time of the measurement signals. At least one process separation device is thereby provided in or on the antenna
(Continued)

unit, which process separation device protects the coupling/decoupling unit from influences of the process, wherein a first process separation device is produced at least partially from a dielectric material with a specified porosity, and wherein the first process separation device is configured to be at least approximately transparent to the high-frequency measurement signals.

8 Claims, 3 Drawing Sheets

(58) Field of Classification Search
USPC .......................................................... 342/124
See application file for complete search history.

(56) References Cited

U.S. PATENT DOCUMENTS

| | | | | |
|---|---|---|---|---|
| 6,266,022 | B1* | 7/2001 | Muller | G01F 23/284 |
| | | | | 324/644 |
| 6,417,748 | B1 | 7/2002 | Lopatin | |
| 6,800,241 | B2* | 10/2004 | Lopatin | B29B 13/065 |
| | | | | 264/125 |
| 7,619,581 | B2 | 11/2009 | Kienzle | |
| 7,872,610 | B2 | 1/2011 | Motzer | |
| 7,999,725 | B2 | 8/2011 | Feisst | |
| 9,000,775 | B2 | 4/2015 | Chen | |
| 9,176,056 | B2 | 11/2015 | Hussain | |
| 9,914,103 | B1* | 3/2018 | Eidelman | B01J 3/08 |
| 2002/0115776 | A1* | 8/2002 | Lopatin | B29B 13/065 |
| | | | | 524/442 |
| 2003/0011449 | A1 | 1/2003 | Helme | |
| 2003/0030517 | A1 | 2/2003 | Munley | |
| 2004/0173020 | A1 | 9/2004 | Edvardsson | |
| 2004/0212529 | A1 | 10/2004 | Fehrenbach et al. | |
| 2006/0001082 | A1* | 1/2006 | Ahn | C23C 14/081 |
| | | | | 257/316 |
| 2006/0011970 | A1* | 1/2006 | Ahn | C23C 14/081 |
| | | | | 257/315 |
| 2008/0121931 | A1* | 5/2008 | Chen | H01L 29/66628 |
| | | | | 257/192 |
| 2009/0212996 | A1* | 8/2009 | Chen | G01F 23/284 |
| | | | | 342/124 |
| 2013/0113500 | A1* | 5/2013 | Chen | G01F 23/284 |
| | | | | 324/637 |
| 2015/0196965 | A1* | 7/2015 | Niu | B23K 1/0056 |
| | | | | 219/74 |

FOREIGN PATENT DOCUMENTS

| | | | |
|---|---|---|---|
| DE | 10057441 A1 | | 5/2002 |
| DE | 10117642 A1 | | 10/2002 |
| DE | 102005049242 A1 | | 4/2007 |
| DE | 102005056042 A1 | | 5/2007 |
| DE | 102006062223 A1 | | 6/2008 |
| DE | 102010031276 A1 | | 1/2012 |
| DE | 102012103493 A1 | | 10/2013 |
| EP | 0922942 A1 | | 6/1999 |
| EP | 2 023 097 | * | 7/2007 |
| EP | 2023097 | * | 7/2007 |
| WO | 2011089399 A1 | | 7/2011 |

OTHER PUBLICATIONS

International Search Report, EPO, the Netherlands, dated Apr. 2, 2015.
English Translation of the International Preliminary Report on Patentability, WIPO, Geneva, CH, dated Aug. 18, 2016.

* cited by examiner

DEVICE FOR DETERMINING OR MONITORING THE FILLING LEVEL OF A FILLING MATERIAL STORED IN A CONTAINER

TECHNICAL FIELD

The invention relates to a device for determining or monitoring the filling level of a filling material stored in a container in a process comprising a signal generating unit which generates high-frequency measurement signals, a coupling/decoupling unit which couples the high-frequency measurement signals to an antenna unit or decouples the high-frequency measurement signals from the antenna unit. The antenna unit has a wave guide and an antenna element which widens in the direction of the filling material, wherein the antenna unit emits the high-frequency measurement signals in the direction of the surface of the filling material and receives the echo signals reflected by the surface of the filling material. A control/evaluation unit is provided which determines the filling level of the filling material in the container from the transit time of the measurement signals, wherein at least one process separation device is provided in or on the antenna unit, which process separation device protects the coupling/decoupling unit from influences of the process.

BACKGROUND DISCUSSION

The usual frequency range of a radar filling level meter that functions on the basis of microwaves is between approx. 1 GHz and 100 GHz. Radar meters determine the filling level of a filling material in a container from the transit time of the microwave measurement signals. Transit time methods use the physical principle that the path of the microwave measurement signals is equal to the product of the transit time and the propagation velocity of the measurement signals. In the case of level measurement, the path is equal to double the distance between the antenna and the surface of the filling material. The useful echo signal, i.e., the portion of the measurement signals that is reflected by the surface of the filling material, and its transit time are determined using the so-called echo function or the digital envelope curve. The envelope curve depicts the amplitudes of the echo signals as a function of the distance between the antenna and the surface of the filling material. The filling level itself can then be determined from the difference between the known distance from the antenna to the bottom of the container and the distance determined by the measurement from the surface of the filling material to the antenna.

Radar meters are differentiated between meters which function according to the pulse radar principle and use broadband high-frequency pulses, and FMCW (frequency-modulated continuous wave) meters, in which the frequency of the continuous microwaves of a wavelength λ is periodically linearly modulated using, for example, a sawtooth voltage.

To ensure consistently good measurement performance, the antenna elements emitting and receiving the measurement signals and the measurement electronics are protected on the process side against environmental influences using process separation elements. This protection is very important, since the filling level meters are exposed to high temperatures, high pressures, and/or aggressive chemical media, depending upon the place of operation. Depending upon the conditions prevailing at the measuring site, the requirements laid down for the protection of the sensitive electronic components are correspondingly high.

From published international patent application, WO 2006/120124 A1, a filling level meter is known, in which a horn antenna is filled at least partially with a temperature-stable dielectric material. The dielectric material is dimensioned in such a way that, at normal temperature, a defined distance between the outer surface of the dielectric filling material and the inner surface of the adjacent antenna element exists. Owing to the design, the filling material can expand with rising temperatures so that no mechanical stresses occur within the filling material.

In the radar meters that Endress+Hauser sells under the designation MICROPILOT®, the process separation device is usually made of PTFE. PTFE has the advantage that it is almost transparent to the microwaves. Furthermore, it shows sufficient temperature, pressure, and/or chemical stability for a variety of applications in process automation. In addition, PTFE has the advantage that it impedes the formation of deposits. If deposits are still formed on the process separation device, problem-free cleaning is possible.

Above 400° C., plastics are no longer stable. For this reason, process separation elements made of ceramics are preferably used in high-temperature and high-pressure ranges. In comparison to plastics, ceramics do, however, have the disadvantage that they have relatively high dielectric constants. This significantly reduces the high-frequency-compatible dimensioning of a process separation device. The smaller the dimensions of the process separation device are, the more prone they are to the formation of condensate and deposits. If, however, the dimensions of the process separation device are adapted to the condensate and deposit problems, increasingly higher modes are excited. If higher modes are excited, the ringing, which describes the portion of the undesired reflections in the antenna region, is amplified. The more intense the "ringing" is, the worse the measurement performance of the filling level meter becomes.

From German patent, DE 102010031276 A1, a filling level meter is known that is suitable for the high-temperature and the high-pressure range. Here, too, a process separation element that allows the microwaves to pass largely undisturbed is inserted into a wave guide in which the high-frequency measurement signals are transmitted. In order to avoid the aforementioned formation of deposits and/or condensate, the process separation element is designed as a hollow piece, wherein the end region facing away from the process is adapted to the diameter of the wave guide, and the end region facing the process is preferably designed to be cone-shaped or pyramid-shaped. The wall thickness of the process separation element in the emission area is approximately half the wavelength of the measurement signals sent and received. In this way, undesired reflections of the measurement signals are largely avoided. The process separation device is produced of a plastic material, a ceramic material, or a dielectric composite material. Preferably, ceramic material is used, since it is highly pressure and temperature resistant.

With the known design, there is, however, the risk that the apex of the cone or pyramid breaks as a result of external mechanical forces—e.g., as the result of a blow. If the process separation device is not sealed, it can no longer fulfill its protective function.

SUMMARY OF THE INVENTION

The invention is based upon the aim of proposing a process separation device for a microwave filling level meter that is transparent to microwave measurement signals and highly mechanically stable.

The aim is achieved by producing a first process separation device at least partially from a dielectric material with a specified porosity. Furthermore, the first process separation device is configured to be at least approximately transparent to the high-frequency measurement signals. As already mentioned above, a process separation device made of ceramics is very well-suited for use at high temperatures and high pressures in automation technology—in particular, in process automation technology. However, a ceramic—in particular, aluminum oxide—has the disadvantage that it has a poor transparency to microwaves due to its high dielectric constant of approx. 10. As a solution to this dilemma, the prior art proposes a thin-wall, hollow, cone-shaped process separation element, whose mechanical stability is, however, lower than that of a process separation device made of solid material.

The proposed solution circumvents the dilemma by producing the process separation device according to the invention from at least one dielectric solid material. In order to achieve as low a dielectric constant as possible that is suitable for use in radar meters and a sufficient dimensioning, the solid material is designed to be at least partially porous. Depending upon the application, the dielectric material is either a plastic that is suitable for high temperatures and pressures or a ceramic. In addition, a fiber-reinforced composite material that has the required temperature and pressure stability may also be used. The risk of breaking or damaging the process separation device is effectively counteracted as a result of the increased stability from the process separation device being made of at least partially foamed solid material. The high stability of the process separation device ensures that no large amounts of material, and, therefore, no significant thermal energy, can reach the downstream sensor and electronic components.

In order to achieve the required transparency of the dielectric material of the process separation device, the porosity of the material is adjusted accordingly. As a guideline: The higher the dielectric constant of the material of the process separation device is, the higher the porosity of the material must be.

By means of the design according to the invention, the dimensioning of the process separation device can be selected in such a way that the deposit and/or condensate problems—in particular, with the critical process separation device facing the process—play only a subordinate role or no role at all.

Via the porosity of the material of the process separation device, the properties of the dielectric material are optimized in such a way that, on the one hand, the process separation effectively and permanently prevents the filling material from the process from entering the electronic component or the coupling/decoupling unit of the filling level meter and, on the other hand, the process separation is largely transparent to the microwave measurement signals. A process separation is transparent to microwaves, if the intensity of the microwave measurement signals is only insignificantly weakened when the signals pass the process separation device. In particular, transparency in connection with the invention means that the dielectric constant of the material or the materials of the process separation device is preferably between 1 and 5.

The porosity defines the ratio of the void volume (usually entrapped air) to the total volume of the porous material or mixture of materials. If the voids are connected to each other or to the environment, the term "open porosity of the material" or "open porous material" is used. If the voids are connected neither to each other nor to the environment, the term "closed porosity of the material" or "closed porous material" is used.

In connection with the invention, a multitude of different designs of process separation devices are possible. The task that a process separation device is to perform is particularly important for the design.

If the process separation device is designed to be closed porous or pore-free in at least the surface area, no medium can enter the area of the filling level meter, which is arranged downstream of the process separation device with respect to the process. However, via an open porous structure in the process separation device, gas or particles of the filling material can enter into the area behind the process separation. The open porous process separation device certainly constitutes at least a barrier for the filling material: The filling material cannot, unimpeded, enter the area behind the process separation, but must first overcome considerable resistance. Open porous process separation devices can, in particular, be used in applications with a low degree of contamination of the meter.

As already mentioned above, it is provided that the porosity of the dielectric material of the first process separation is selected in such a way that the dielectric material has a specified dielectric constant. Preferably, this lies between 1 and 5.

According to a preferred embodiment of the device according to the invention, the first process separation device is arranged such that at least one segment of its surface coming into contact with the process is prepared of a closed porous dielectric material. Naturally, the protective layer may also be pore-free. This design ensures that no filling material or particles of the filling material can enter the process separation device from the process in the area of the filling level meter. The interior space to be protected of the meter with its components that are sensitive to deposits is effectively sealed off from the process by an accordingly designed process separation device.

An alternative solution provides that the inner core material of the first process separation device is designed to be open porous. At least in the segment that comes into contact with the process, a protective layer is applied to the inner core material, wherein the protective layer consists of a closed porous or an essentially pore-free dielectric material. For the dielectric material of the core and the protective layer, either the same material or different materials can be used.

One advantageous embodiment of the solution according to the invention provides for a second process separation device that is arranged in front of the first process separation device when viewed in the direction of emission of the high-frequency measurement signals. The second process separation device is either produced from a closed porous dielectric material or consists of an open porous core and a closed porous or essentially pore-free protective layer that surrounds the open porous core. The advantages must be evaluated analogously to the previous explanations regarding the first process separation device.

In an alternative embodiment, a second process separation device is also provided and arranged in front of the first process separation device when viewed in the direction of emission of the high-frequency measurement signals. Now, the second process separation device does, however, consist completely of an open porous dielectric material. In this case, when the first process separation device is damaged or destroyed, the second process separation device still fulfills at least the function of a barrier which stops the filling material or particles of the filling material from entering, unimpeded, the area of the filling level meter that is separated by the process separation element.

In the second process separation device, the porosity of the dielectric material is also dimensioned in such a way that the dielectric material has a specified dielectric constant. Preferably, this also lies between 1 and 5.

It has already been mentioned above that, depending upon the embodiment of the invention, the first and the second process separation devices comprise a protective layer made of a closed porous or pore-free dielectric material. Preferably, the thickness of each of the two protective layers is $\lambda/2$. Here, $\lambda$ denotes the wavelength of the high-frequency measurement signals or the center wavelength of a pulse of high-frequency measurement signals.

As already previously mentioned, the dielectric material is a temperature-resistant plastic or a ceramic. However, a composite material, such as a fiber-reinforced plastic, may also be used. Preferably, the dielectric material is aluminum oxide, which, depending upon the design of the first and second process separation devices, is designed to be open porous or closed porous or essentially pore-free, at least in defined segments.

BRIEF DESCRIPTION OF THE DRAWINGS

The invention is explained in more detail by means of the following figures. The following is shown.

DETAILED DISCUSSION IN CONJUNCTION WITH THE DRAWINGS

Figure 1:
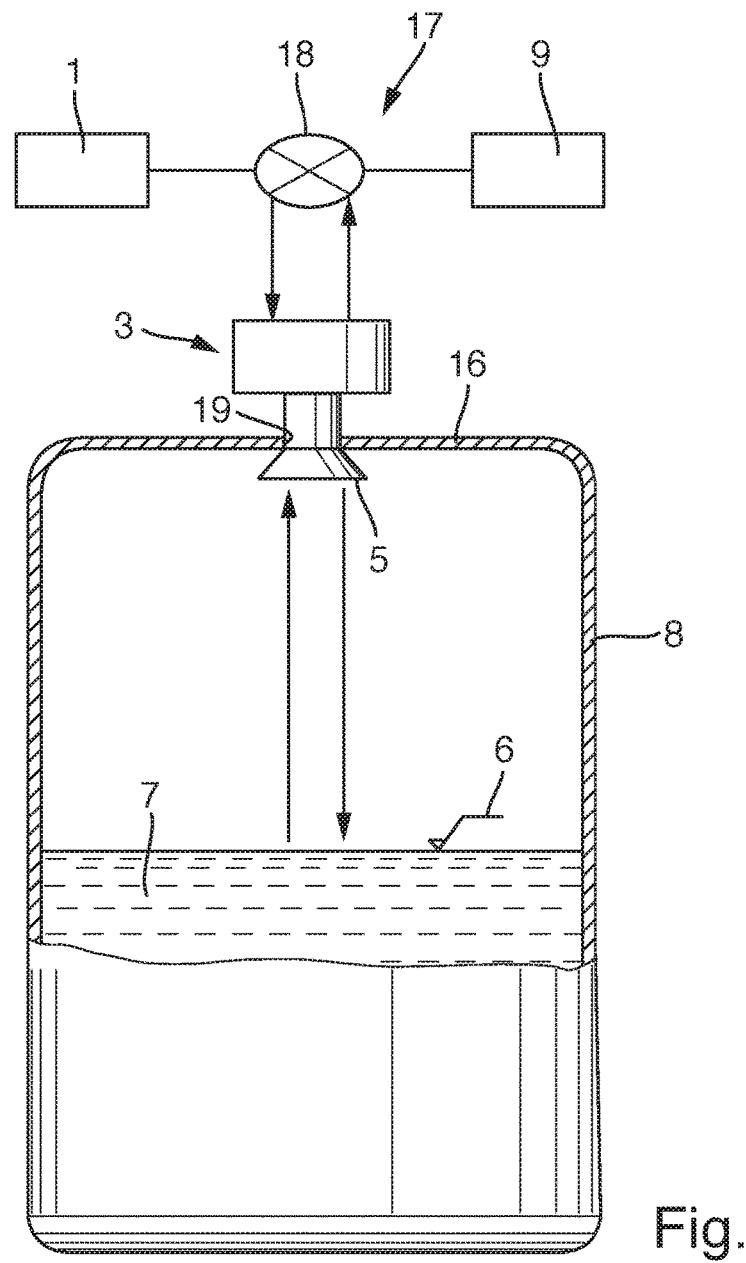
FIG. 1: is a schematic representation of the device according to the invention, which is mounted on a container.

FIG. 1 shows a schematic diagram of the device according to the invention. A liquid or solid filling material 7 is stored in the container 8. The filling level meter 17, which is mounted in an opening 19 in the lid 16 of the container 8, is used to determine the filling level of the filling material 7 in the container 8. The microwave measurement signals generated in the signal generating unit 1 are coupled into the antenna unit 3 and emitted via the antenna 5 in the direction of the surface 6 of the filling material 7. On the surface 6, the measurement signals are at least partially reflected as echo signals. The echo signals are received by the antenna unit 3 and transmitted to a control/evaluation unit 9 for the purposes of conditioning and evaluating the filling level measured values. The control/evaluation unit 9 is assigned to a delay circuit as described, for example, in German Patent, DE 31 07 444 A1. The correct timing of sending the measurement signals and receiving the echo signals is effected by the duplexer 18. The components 1, 9, 18 are part of the so-called transducer or transmitter and are usually arranged in a transducer or transmitter housing not shown separately in FIG. 1. In particular, these components of the transducer that are sensitive to deposits, pressure, and/or temperature, are the ones that are protected against negative influences of the process by means of the process separation devices 10, 13.

Preferred embodiments of the antenna unit 3 comprising at least one of the process separation devices 10 or 10, 13 according to the invention are illustrated in more detail in the figures below. The process separation devices 10, 13 according to the invention are preferably designed in such a way that they are at least approximately transparent to microwave measurement signals. Moreover, they are characterized—depending upon function—by a high mechanical stability and a low sensitivity to condensate and deposits.

In addition to the components of the electronic part mentioned already, the first process separation device 10, which is in contact with the process or the medium in a surface area, in particular, also protects the coupling/decoupling unit 2 and the wave guide 4 of the antenna unit 5 against penetration by particles of the filling material and thus against detrimental influences of the process. These influences would significantly impair the measurement precision of the filling level meter 17. In principle, all areas of the filling level meter 17 located in front of the process separation device 10 when viewed in the direction of emission of the high-frequency measurement signals are protected by the first process separation device 10, which faces the process, i.e., is in contact with the medium and/or the process. A general rule in this connection is that the smaller the wavelength of the measurement signals is, i.e. the higher the frequency of the measurement signals, the smaller the dimensioning of the antenna unit 3 that is selected. The smaller the wavelength is, the more deposits in the emission and reception area of the antenna unit impair the measurement quality or the measurement performance.

It goes without saying that, depending upon the application in which the filling level meter 17 is used, the requirements for the process separation device 10 and the process separation device 13 can be very different. The spectrum of possible embodiments and combinations of the process separation devices 10, 13 is accordingly broad.

Figure 2:
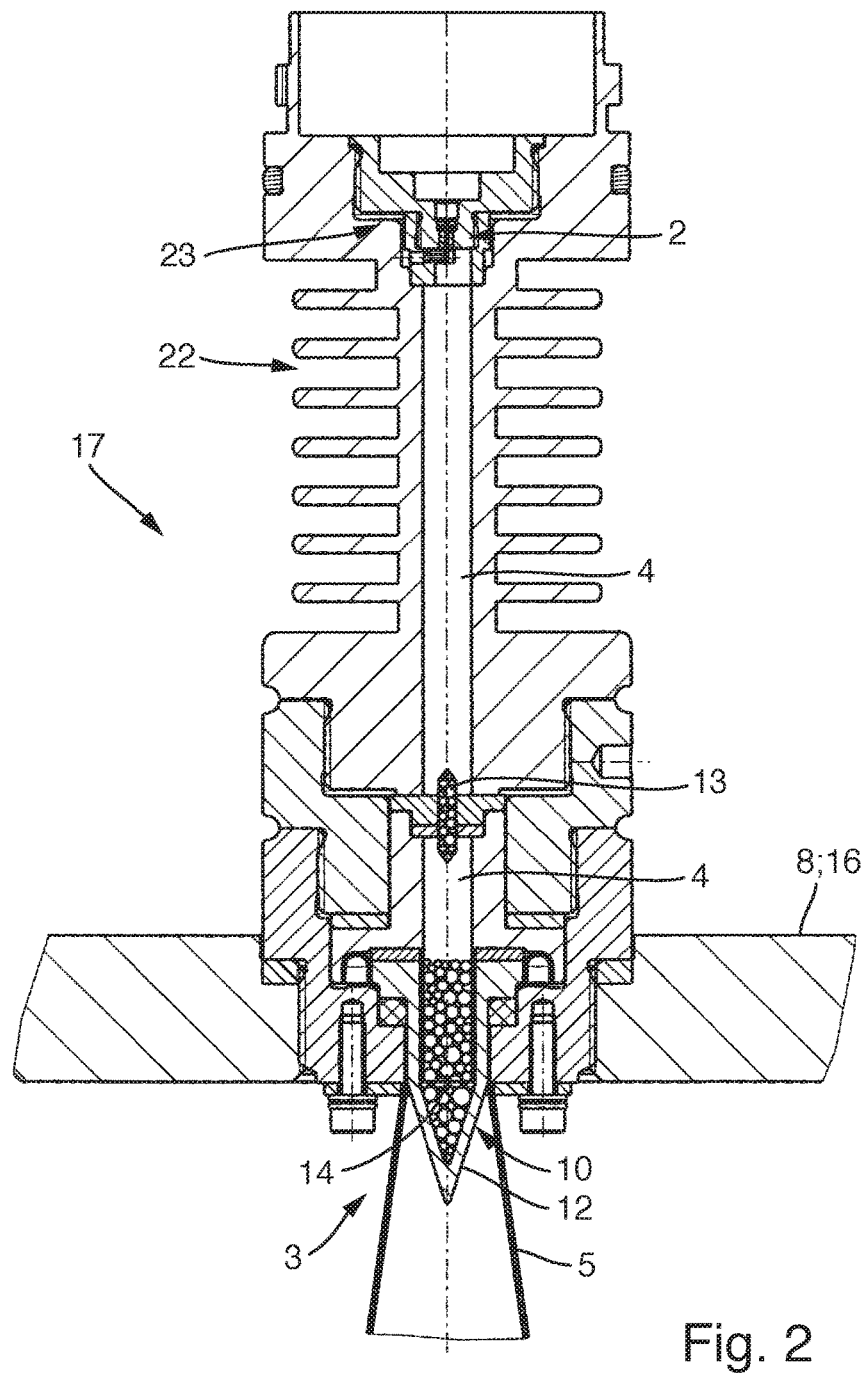
FIG. 2: is a longitudinal section through a preferred embodiment of the filling level meter according to the invention.
Figure 3:
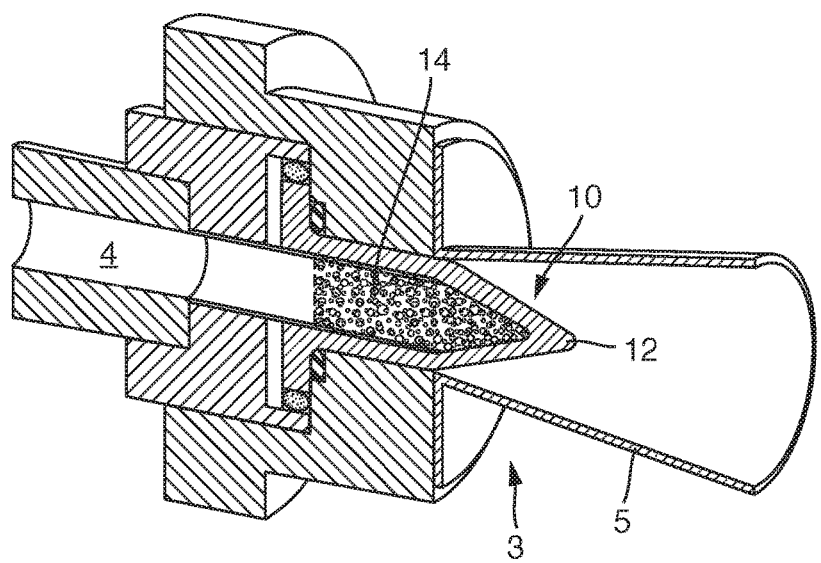
FIG. 3: is a perspective view of a longitudinal section through a portion of the embodiment of the filling level meter according to the invention shown in FIG. 2.

FIG. 2 shows a longitudinal section through a preferred embodiment of the filling level meter 17 according to the invention. FIG. 3 shows a perspective view of a longitudinal section through a portion of the embodiment of the filling level meter 17 according to the invention shown in FIG. 2.

The temperature-reduction unit 22 indicates that this embodiment is suitable for the high-temperature range, i.e., the filling level meter 17 sketched in FIG. 2 can be used at temperatures of up to 450° C. This embodiment differs from the known solutions by the particular design and/or arrangement of the process separation devices 10, 13. The process separation device 10, which is facing the process and therefore comes into contact with the medium or the process, comprises a cylinder 20 and a cone 21. The process separation device has a core 14, which consists of a porous dielectric material, and a dielectric protective layer 12, consisting of a pore-free or a closed porous dielectric material. It goes without saying that the materials of the core 14 and the protective layer 12 are the same material with different porosities, or that the materials of the core 14 and the protective layer 12 are different. If the protective layer has a thickness of $\lambda/2$, its porosity is of no importance for the transparency of the process separation device 10, 13. A sufficient mechanical stability is achieved by the core 14. In order that the core 14 also reduce the transparency of the process separation device 10, 13 only within acceptable limits, the core 14 consists of a porous dielectric material. Here, the porosity is selected so as to be higher, the higher the dielectric constant of the material of the core 14 is. In order to achieve the same transparency, the porosity of a plastic can usually be selected so as to be smaller than that of a ceramic. The material that is ultimately used depends upon the physical and chemical conditions that prevail in the process.

In the embodiment that is shown in FIG. 2 and in which the first process separation device 10 is designed to be extremely stable, the requirements for the stability of the second process separation device 13 are relatively low. Since the second process separation device 13 can, after all, come into direct contact with the process only if the first process separation device 10 is damaged or broken, the formation of condensate or deposits plays a subordinate role. The second process separation device 13 can therefore consist, for example, of an open or closed porous dielectric material. In the case shown, the second process separation device 13 has a significantly smaller dimensioning than the first process separation device 10. In particular, it has the shape of a double cone. It goes without saying that the second process separation device 13 can also be designed to be a disk. As already described previously, the second process separation device 13 can also be constructed analogously to the first process separation device 10, i.e., with a porous core and a protective layer. The second process separation device 13 must be constructed only in such a way that the filling material or particles of the filling material 7 cannot enter, unimpeded, the inner area of the filling level meter 17, if the first process separation 10 is destroyed or broken. The second process separation device 13 is designed in such a way that it at least fulfills the function of a barrier.

It has already been mentioned above that both process separation devices 10, 13 need not necessarily be gas tight. The gas tightness of the filling level meter is achieved in any case by the glass feed-through 23.

Figure 4:
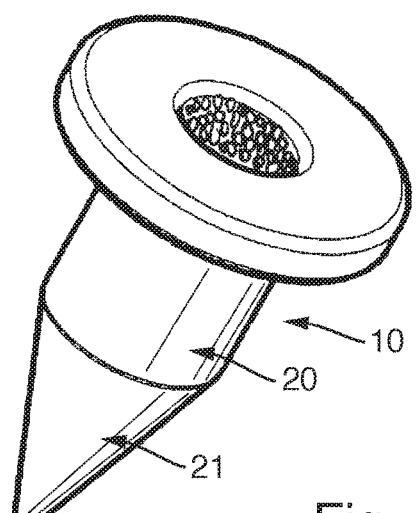
FIG. 4: is a perspective view of the first process separation element.

FIG. 4 shows a perspective view of a preferred embodiment of the first process separation element 10 with a cylinder 20 and a cone 21. The process separation element 10 can be designed as described in FIG. 2 or FIG. 3. Depending upon the application, the process separation device 10 consists entirely or in segments of an open porous and/or closed porous material. For example, the process separation device 10 can be designed to be a completely open porous or closed porous plastic. Likewise, a closed porous or open porous ceramic can be used. In the two embodiments, a protective layer 12 can additionally be provided. The second process separation device 13 can also have an analogous design.

As already mentioned, the thickness of the protective layer is preferably $\lambda/2$. In the transition from the porous structure to the protective layer—as present in the invention—the dielectric constant increases. This is the reason that an additional phase shift of $\lambda/2$ occurs. Thus, the total path difference between the two partial waves is $2*\lambda/2+$ phase shift $\lambda/2=3/2\lambda\Lambda$, and the interference is destructive. However, $\lambda/4$ applies, if the dielectric constant decreases in the transition, and, therefore, a phase shift does not occur.

The invention claimed is:

1. A device for determining or monitoring the fill level of a filing material stored in a container in a process, comprising:
a control/evaluation unit;
at least one process separation device;
an antenna unit;
a signal generating unit which generates high-frequency measurement signals; and
a coupling/decoupling unit which couples said high-frequency measurement signals to said antenna unit or decouples said high-frequency measurement signals from said antenna unit, wherein:
said antenna unit emits high-frequency measurement signals in a direction of a surface of the filling material and receives the echo signals reflected by the surface of the filling material;
said control/evaluation unit determines the filing level of the filling material in the container from a transit time of said high-frequency measurement signals;
said at least one process separation device is provided in or on said antenna unit, which said at least one process separation device protects said coupling/decoupling unit from influences of the process;
said at least one process separation device is produced at least partially from a dielectric material with a specified porosity; and
said at least one process separation device is configured to be at least approximately transparent to said high-frequency measurement signals;
wherein the dielectric material is aluminum oxide, and the porosity is selected in such a way that the dielectric constant of the process isolating element is in the range between 1 and 5.

2. The device according to claim 1, wherein:
said at least one process separation device is arranged such that at least one segment of its surface coming into contact with the process is produced from a closed porous dielectric material.

3. The device according to claim 1, wherein:
an inner core of said at least one process separation device is designed to be open porous;
a protective layer is applied at least on the segment of said at least one process separation device coming into contact with the process; and
said protective layer consists of a closed porous or essentially pore-free dielectric material.

4. The device according to claim 3, wherein:
the thickness of each of the two protective layers is preferably $\lambda/2$, where $\lambda$ denotes the wavelength of the high-frequency measurement signals or the center wavelength of a pulse of high-frequency measurement signals.

5. The device according to claim 1, wherein:
a second process separation device is provided that is arranged in front of a first process separation device when viewed in the direction of emission of the high-frequency measurement signals; and
said second process separation device is made of a closed porous dielectric material or wherein said second process separation device consists of an open porous core and a closed porous or essentially pore-free protective layer that surrounds the open porous core.

6. The device according to claim 5, wherein:
the porosity of the dielectric material of said second process separation device is dimensioned in such a way that the dielectric material has a specified dielectric constant.

7. The device according to claim 1, wherein:
a second process separation device is provided that is arranged in front of a first process separation device when viewed in the direction of emission of the high-frequency measurement signals; and
said second process separation device is completely made of an open porous dielectric material.

8. The device according to claim 1, wherein:
the dielectric material is a temperature-resistant plastic or a ceramic.

* * * * *